US005261123A

United States Patent [19]

Tomljenovic et al.

[11] Patent Number: 5,261,123

[45] Date of Patent: Nov. 9, 1993

[54] AM RADIO TRANSMITTER WITH A FINAL STAGE TETRODE

[75] Inventors: Juraj Tomljenovic, Tegerfelden; Wilhelm Tschol, Fislisbach, both of Switzerland

[73] Assignee: Asea Brown Boveri Ltd., Baden, Switzerland

[21] Appl. No.: 823,368

[22] Filed: Jan. 21, 1992

[30] Foreign Application Priority Data

Jan. 21, 1991 [EP] European Pat. Off. ........ 91100662.5

[51] Int. Cl.[5] .............................................. H04B 1/02

[52] U.S. Cl. .................................... 455/108; 332/182

[58] Field of Search ................ 455/108; 332/182, 179; 313/346 R, 296, 297

[56] References Cited

U.S. PATENT DOCUMENTS 3,760,218 9/1973 Cronin ........................... 313/346 R
4,864,635 9/1989 Kyrian et al. ...................... 455/108

OTHER PUBLICATIONS

The Radio Amaleur's Book Harol Book 1966; p. 433 and pp. V29–V31.

*Primary Examiner*—Reinhard J. Eisenzopf
*Assistant Examiner*—Andrew Faile
*Attorney, Agent, or Firm*—Oblon, Spivak, McClelland, Maier & Neustadt

[57] ABSTRACT

In the case of a high power AM radio transmitter with a tetrode as final stage tube (13), this final stage tube (13) is designed as a low voltage tetrode with a d.c. plate voltage <10 kV and an plate efficiency of >80%. By utilizing these measures, a compact transmitter design is achieved with virtually unchanged overall efficiency.

7 Claims, 3 Drawing Sheets 1 2 3 4 5 6 7 8 9 10 34 11 12 13 14 15 16 17 18

16 OSCILLATOR

17 OUTPUT CIRCUITRY

14 DRIVER CIRCUITRY

AM RADIO TRANSMITTER WITH A FINAL STAGE TETRODE

BACKGROUND OF THE INVENTION

1. Field of the Invention

The present invention relates to the field of radio technology. It relates in particular to an AM radio transmitter with an output power of at least 50 kW, comprising (a) a low frequency part with a low frequency input and a modulation amplifier attached to the low frequency input; and (b) a high frequency part with an oscillator, a driver amplifier attached to the oscillator and a final stage tube in the form of a tetrode, which exhibits a plate, a cathode, a control grid and a screen grid, where the plate communicates with the output of the modulation amplifier and the control grid communicates with the output of the driver amplifier.

Such a radio transmitter is known, e.g. from the document Brown Boveri Mitt. 69, 1982 (6), pp. 212–217.

2. Discussion of the Background

The existing kinds of radio transmitters with amplitude modulation (AM) are used especially in the short-wave range (about 3.9–26.1 MHz). The low frequency portion provides for the processing and power amplification of the low frequency signal that is to be transmitted and which is given then (during the typical plate modulation) on the plate of the final step tube. The carrier frequency oscillator with the subsequent driver step makes available in the high frequency portion a power amplified carrier signal, which gets on the control grid of the final stage tube and together with the plate voltage oscillating in synchronous operation with the low frequency signal delivers the desired AM signal to the load, the aerial.

Since such radio transmitters operate usually in a power range of more than 50 kW to a few 100 kW output power, the efficiency, i.e. the ratio of the input power to the usable power, plays a central role in the development and design of such a transmitter. The final stage tube has the controlling portion of the total efficiency of the transmitter, which can be greater than 70%.

Its efficiency, the so-called plate efficiency, is, among other things, proportional to the expression $1-(U_S/U_{AO})$, where $U_S$ (also called $U_{AR}$) denotes the non-modulatable residual voltage and $U_{AO}$ (also called $U_A$) the d.c. plate voltage. Therefore, the plate efficiency increases with constant residual voltage with increasing d.c. plate voltage (Brown Boveri Mitt. 71, 1984 (5), p. 199).

Therefore, a good plate efficiency requires in all cases a high d.c. plate voltage $U_{AO}$, so that the non-modulatable residue $U_S$ remains relatively small in comparison (see to this end: Meinke/Bundlach, Handbook of High Frequency Technology, 3rd ed., Springer-Verlag 1968, pp. 1035–1037). Therefore, the usual operating voltages for high power transmitters with high power tetrodes in the high frequency final stage ranges today from 10 to 14 kV (see to this end: Meinke/Gundlach, Handbook of High Frequency Technology, 4th ed., Springer-Verlag 1986, p. p9).

As examples of these values obtained in the state of art reference is made to the following two short-wave transmitters.

(1) To the 250 kW short-wave transmitter, which is described in the aforementioned document and whose high frequency final stage is equipped with a high power tetrode of the BBC CQK 350-1 model. This tetrode operates with plate modulation in the class C operation with a d.c. plate voltage of 14 kV, a d.c. screen grid voltage of 1300 V and a d.c. control grid voltage of −900 V and has an efficiency of 85.2% (Brown Boveri Mitt. 69, 1982 (6), p. 219).

(2) To the 100 kW short-wave transmitter, which is described in the document Brown Boveri Mitt. 67, 1980 (3), pp. 215–219 and whose high frequency final stage is equipped with a high power tetrode of the BBC CQK 50-2 model. This tetrode operates with plate modulation in the class C operation with a d.c. plate voltage of 11 kV, a d.c. screen grid voltage of 800 V and a d.c. control grid voltage of −600 V (BBC Brief Information Catalog Electronic Tubes, Document no. CH-E 3.30475.8 D/F/E/8 of 1982/1983).

The comparatively high plate voltages require in connection with the plate modulation suitably designed modulation amplifiers that have to deliver at a d.c. plate voltage of 14 KV output voltages ranging from 0 to 28 kV.

If, for example, a pulse step modulator PSM, i.e. a digital switching amplifier, is used as the modulation amplifier, 32 switching stages, whose output voltages are added to the desired plate voltage, are required, for example, within this PSM (Brown Boveri Tech. 74, 1987 (6), pp. 296–302). Since every single one of these 32 high power switching stages demands suitable space, separate cubicles must be provided for the PSM in the transmitter.

However, the high d.c. plate voltage and the dielectric strength necessary for this voltage for other components of the transmitting circuit also lead to increased space requirements, so that the transmitter must have in total a very complex design.

One possible decrease in the d.c. plate voltage would lead in the case of the conventional final tubes to a decrease in the design complexity, but would reduce, on the other hand, the efficiency of the tube and thus the total efficiency of the transmitter to a nonjustifiable value.

SUMMARY OF THE INVENTION

Therefore, the object of the present invention is to provide a radio transmitter, which at constant efficiency is characterized by a decreased complexity in design and lower space requirements.

The problem with an AM radio transmitter of the aforementioned kind is solved in that (c) the final stage tube is a low voltage tetrode, which is operated at a d.c. plate voltage $<10$ kV; and d) the final stage tube exhibits a plate efficiency greater than 80%.

The core of the invention consists of using a so-called low voltage tetrode as the final stage tube, which at a significantly reduced d.c. plate voltage exhibits an efficiency comparable to that of the conventional high power tetrodes.

A first preferred embodiment of the radio transmitter according to the invention is characterized by the fact that (a) the cathode of the final stage tube is designed as an indirectly heated, BaO-containing matrix cathode;

(b) the control grid and the screen grid of the final stage tube are spaced less than 1 mm apart (a2, a1) and from the matrix cathode;

(c) the control grid is driven with a control grid voltage of greater than −250 V; and (d) the screen grid is driven with a screen grid voltage of less than 650 V.

The reduction in the d.c. plate voltage while maintaining constant efficiency is achieved in this embodiment through a significant reduction in the electrode distances, which, among other things, is possible due to the fact that the cathode temperature is drastically reduced by a special construction of the cathode.

Since with the d.c. plate voltage the d.c. grid voltages are also reduced (the d.c. control grid voltage determines the aforementioned residual plate voltage), the efficiency of the tube and thus the transmitter can be virtually maintained.

In another preferred embodiment (a) the modulation amplifier is designed as a digital pulse step modulation (PSM) amplifier;

(b) an A/D converter is arranged between the modulation amplifier and the low frequency input; where (c) the modulation amplifier comprises a plurality of identical switching stages; and (d) the number of switching stages is less than 20, preferably less than 14.

Other embodiments following from the dependent claims.

BRIEF DESCRIPTION OF THE DRAWINGS

The invention shall be explained in detail with the aid of the embodiments with reference to the drawings as follows.

DESCRIPTION OF THE PREFERRED EMBODIMENTS

Figure 1:
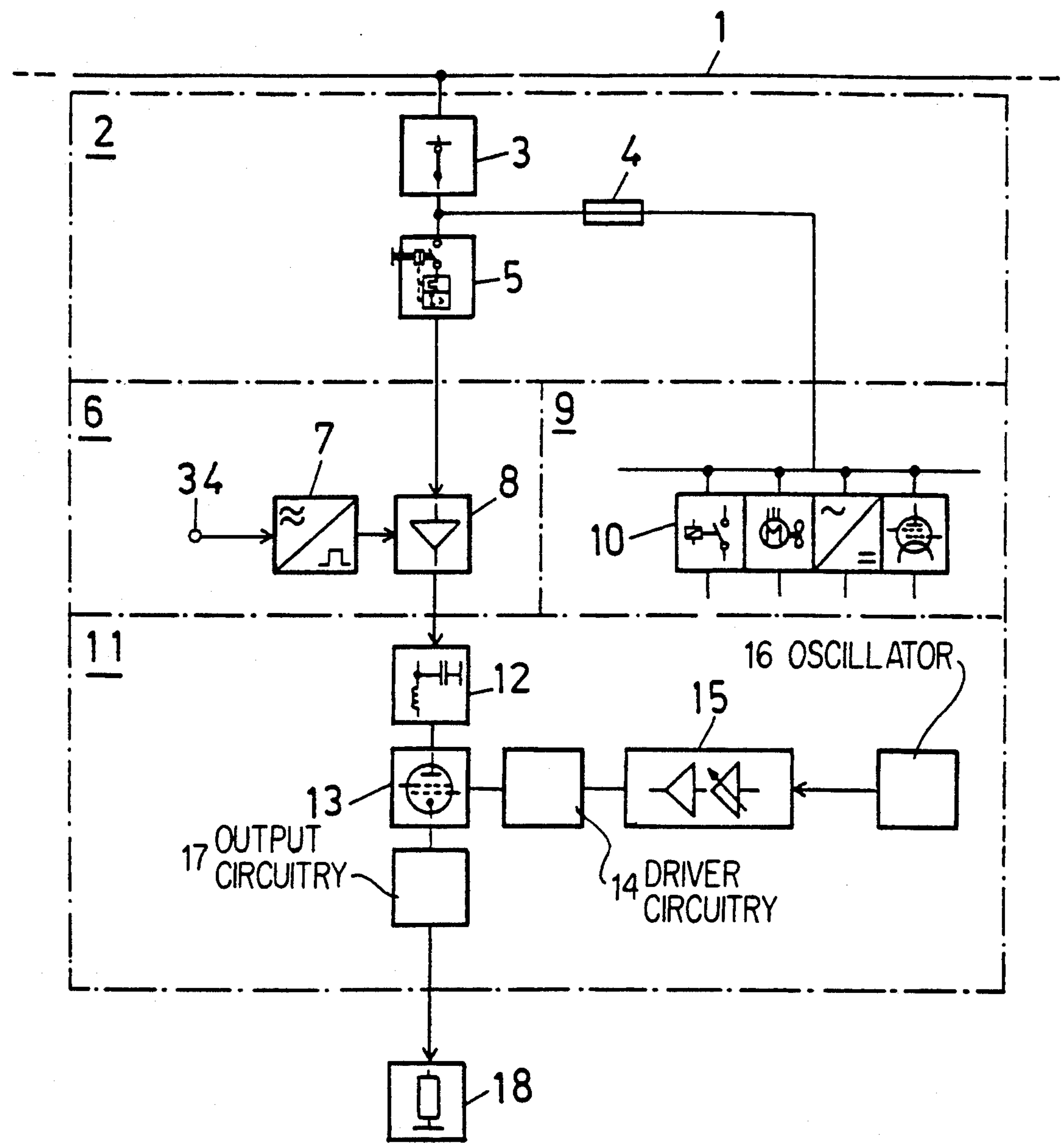
FIG. 1 is a schematic view of the construction of a short-wave transmitter according to a preferred embodiment of the invention.

The invention is explained in the following with the aid of an example of a 100 kW short-wave transmitter, whose schematic circuit arrangement is shown in FIG. 1. The transmitter comprises in essence four functional parts, viz. a mains input part 2, a low frequency part 6, a control part 9 (electronics and auxiliaries) and a high frequency part 11.

The main input part 2 communicates with a mains 1 (e.g. 380 V, three phase, 50/60 Hz) and contains a main switch 3, an overload protection 5 and a fuse 4. The current is supplied from the mains 1 by means of the main switch 3 and subsequently branches off. The one branch goes over the fuse 4 to the control part 9; the other branch over the overload protection 5 to the low frequency part 6.

Control and various auxiliaries 10, by means of which the individual parts of the transmitter such as the tube, motors or the electronics are supplied with current, are combined in the control part 9.

The low frequency part 6 contains a modulation amplifier 8, whose input communicates with a low frequency input 34 for the low frequency signal to be transmitted. If the modulation amplifier 8 is designed as a digital PSM amplifier—as assumed in this example and is well-known from the state of the art—, an A/D converter 7, which converts the analog low frequency signal into a digital control signal for the PSM amplifier, is also arranged between the low frequency input 34 and the input of the modulation amplifier 8.

The high frequency part 11 comprises a low pass 12 (plate filter) a final stage tube 13 in the form of a tetrode with plate, screen grid, control grid, and cathode, a driver circuitry 14, a driver amplifier 15, an oscillator 16 and an output circuitry 17.

The output voltage of the modulation amplifier 8 travels from the low frequency part 8 via the low pass 12 as a plate voltage to the plate of the final stage tube 13. The oscillator 16 produces a carrier frequency, whose power is amplified in the driver amplifier 15 (e.g. a transistorized 1 kW amplifier) and is then delivered by means of the driver circuitry 14 to the control grid of the final stage tube 13. The amplitude-modulated carrier oscillation generated in the final stage tube 13 is then emitted by means of an output circuity 17 to a load, as a rule an aerial, attached to the transmitter.

Figure 2:
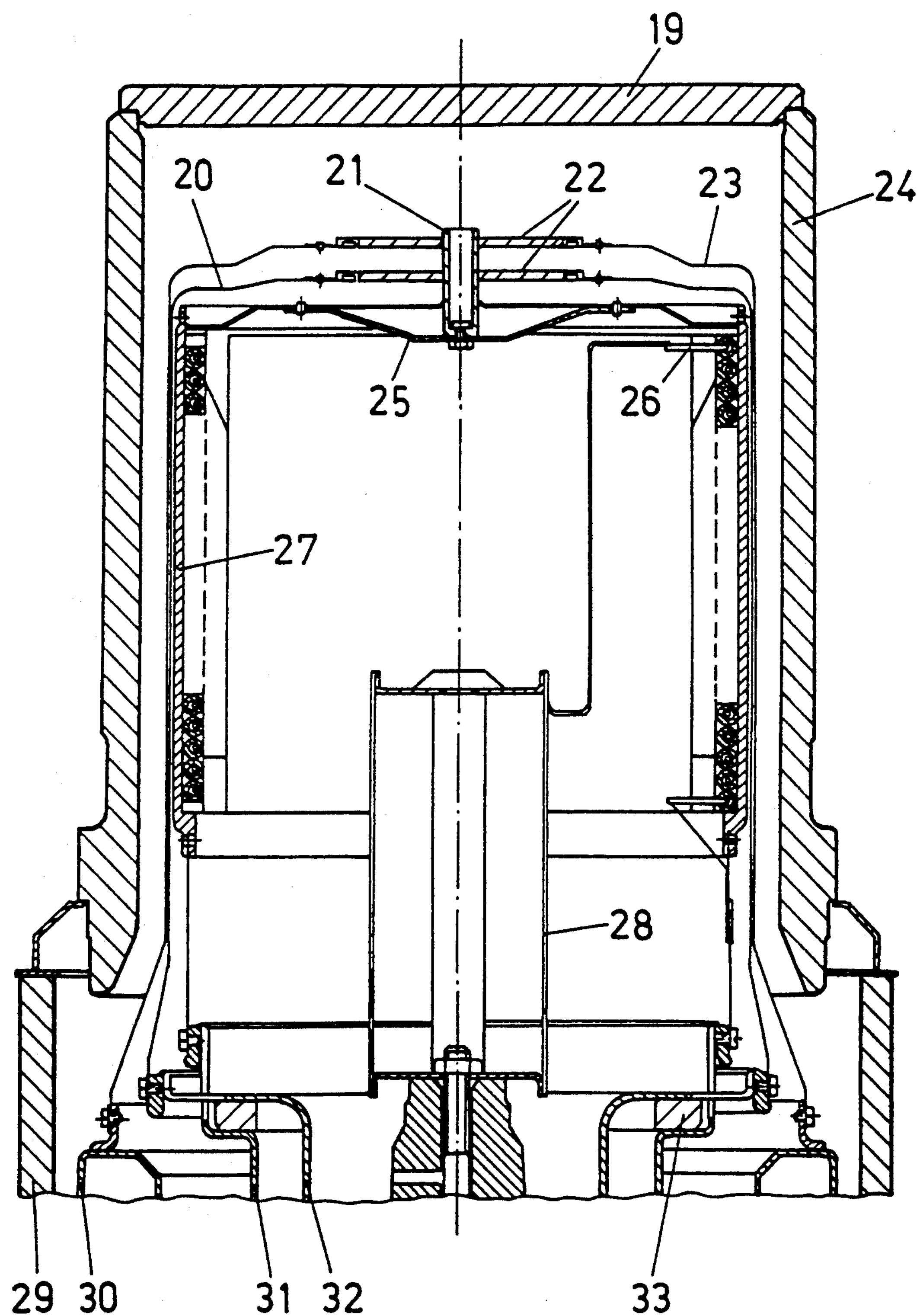
FIG. 2 is a cross sectional view of the exemplary construction of a low voltage tetrode, as used in a transmitter according to FIG. 1.
Figure 3:
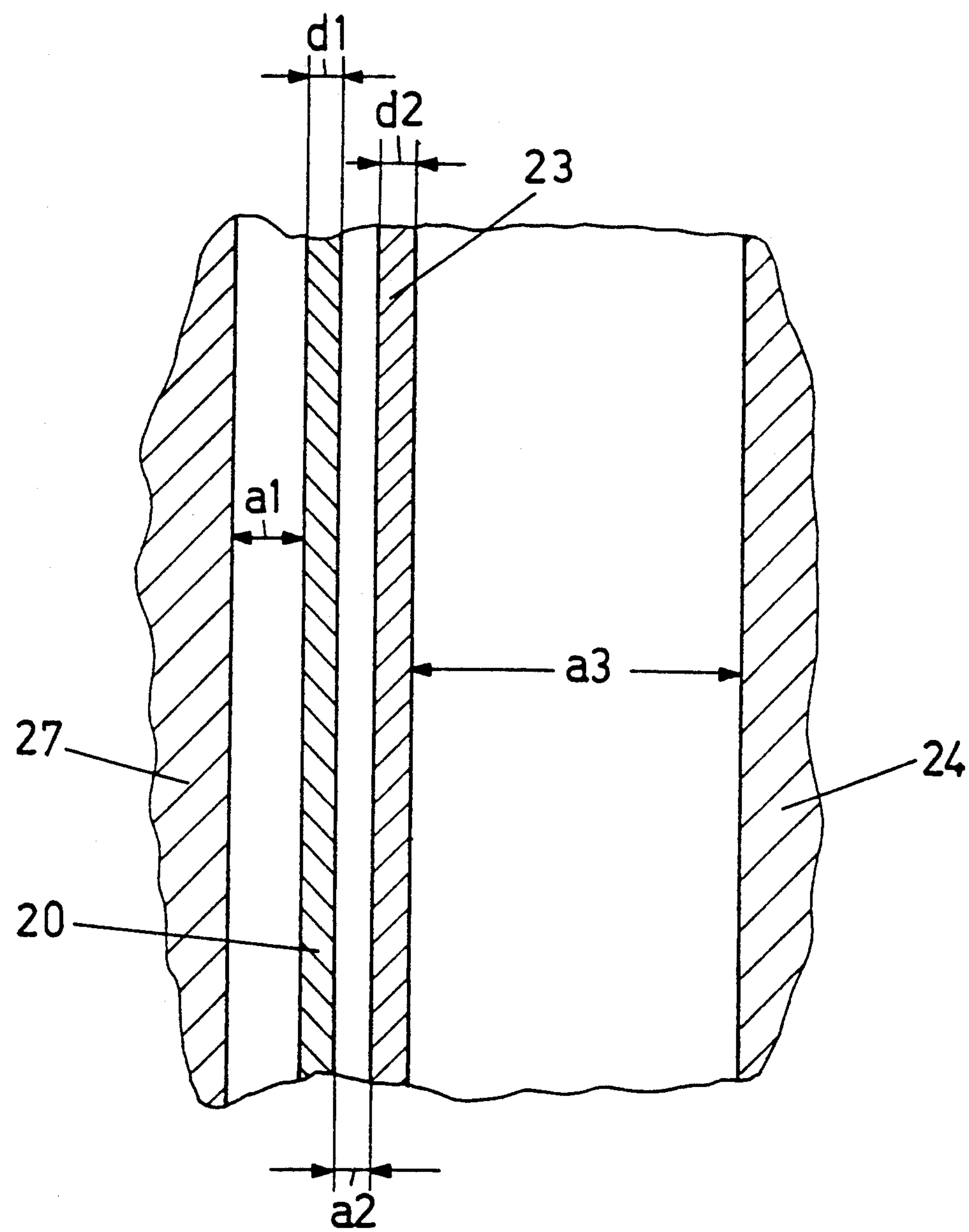
FIG. 3 shows an enlarged detail of the geometry of the electrode arrangement in a tube according to FIG. 2.

The final stage tube 13 is essential to the invention. It is designed as a low voltage tetrode, which is driven with a d.c. plate voltage of less than 10 kV (here: 5 kV) at a plate efficiency of greater than 80% (here: >83%). FIG. 2 shows a cross sectional view of a preferred embodiment of such a low voltage tetrode, which is provided as the final stage tube for the 100 kW short-wave transmitter. For the sake of straight-forwardness, a detailed drawing of the bottom tube base and the outer plate cooling has been dispensed with. FIG. 3 is a fragmentary and enlarged view of the electrode arrangement of the tube.

The tube that is shown contains as the essential elements in coaxial arrangement from the inside to the outside a cylindrical matrix cathode 27, a cup-shaped control grid 20, a cup-shaped screen grid 23 and a plate cylinder 24, which is closed at the top by a plate cover 19.

The plate cylinder 24 is insulated by a ceramic ring 29 in the direction of the tube base. The screen grid 23 passes over towards the bottom into a screen grid connection 30, the control grid 20 into a control grid connection 32, and the matrix cathode 27 passes over into a cathode connection 31.

The matrix cathode 27 contains in a metal matrix BaO, which forms a Ba layer on the surface that emits at much lower temperatures (about 1000°–1100° K.) as compared to the conventional tungsten thorium cathodes (working temperature: about 1900° K.). The matrix cathode 27 is heated indirectly by means of a heating spiral 26 arranged on the inside of the matrix cathode. The heating current required to this end is fed to the heating coil by means of a central internal sheet-metal cylinder 28 and the cathode connection 31.

The comparatively low working temperature of the matrix cathode 27 reduces, in addition to the requisite heating power, above all the thermo-mechanical stresses, induced by the temperature differences, in the electrode system, so that control grid 20 and screen grid 23 can be arranged very close to the cathode.

While in the case of a conventional high power transmitter tetrode with tungsten-thorium cathode and a d.c. plate voltage of about 14 kV, the distance between the cathode and the control grid and the distance between the control grid and the screen grid ranges from 1 to 2 mm, these distances (a1 and a2 in FIG. 3) are less than 1 mm in the embodiment described here and are preferably about 0.55 mm or 0.45 mm for a low voltage tetrode with a d.c. plate voltage of about 5 kV.

The small electrode distances require a careful attachment of the individual electrodes: the upper end of control grid 20 and screen grid 23 are attached by means of ceramic disks 22 and a central ceramic sleeve 21 to a sheet metal holder 25 extending from the matrix cathode 27. In the tube base the control grid connection 32 is led through the cathode connection 31 into the interior and supported there by means of a ceramic washer 33 on the cathode connection 31. By means of these measures the critical electrode distances can be maintained especially effectively.

Control grid 20 and screen grid 23 are manufactured preferably as a perforated cylinder made of pyrolytic graphite and with a thickness (d1 or d2 in FIG. 3) of about 0.3 mm. The distance between the screen grid 23 and the plate cylinder 24 (a3 in FIG. 3) is then about 6.4 mm.

For a better overview, the following table compares the electric operating values of a low voltage tetrode (LVT) in the preferred embodiment for a 100 kW shortwave transmitter with the operating values of a conventional tetrode of identical power (the aforementioned BBC CQK 50-2):

| working values | LVT | CQK 50-2 |
|---|---|---|
| d.c. plate voltage | 5 kV | 11 kV |
| screen grid voltage | ≦500 V | 800 V |
| control grid voltage | −150 V | −600 V |
| d.c. control grid current | 1 A | 0.4 A |
| d.c. plate current | ≦26 A | 10 A |
| plate efficiency | >83% | 85% |
| heating power | <2 kW | 4.2 kW |

The table shows clearly that the low voltage tetrode compared to the conventional tetrode at virtually unchanged efficiency for its operation requires a very much lower d.c. plate voltage, a considerably lower drive power and a very reduced heating power.

These properties have direct advantageous effects on the design of the transmitter:

Due to the low d.c. plate voltage the modulation amplifier 8 can be equipped now with only 14 or less switching stages, instead of the previous 32, when the modulation amplifier is designed as a digital PSM amplifier according to a preferred embodiment. In this manner the space requirement is reduced to such an extent that the PSM amplifier can be housed directly in the cubicle for the high frequency part.

Due to the low drive power the previously conventional driver tube can be replaced by a transistorized driver amplifier of lower power, a feature that benefits the overall efficiency and further reduces the space requirement.

Due to the reduced heating power and the low cathode temperature, the efficiency is improved and the life span of the final stage tube is significantly extended.

In total the invention provides thus for a transmitter that is characterized by a compact construction and very high reliability while the high overall efficiency remains unchanged.

We claim:

1. An AM radio broadcast transmitter with an output power of at least 50 kW, comprising (a) a low-frequency part (6) with a low-frequency input (34) and a modulation amplifier (8) attached to the low-frequency input (34); and (b) a high-frequency part (11) with an oscillator (16), a driver amplifier (15) attached to the oscillator (16) and a final stage tube (13) in the form of a tetrode, which exhibits a plate, a cathode, a control grid (20) and a screen grid (23), where the plate is connected to the output of the modulation amplifier (8) of the low-frequency part (6) and where the control grid (2) is connected to the output of the driver amplifier (15), wherein (c) the final stage tube (13) is a low-voltage tetrode, which is operated with a d.c. plate voltage less than 10 kV, and whose cathode of the final stage tube (13) is designed as a BaO-containing matrix cathode that is heated indirectly;

(d) the control grid (20) and the screen grid (23) of the final stage tube (13) are spaced less than 1 mm apart from each other (a2, a1) and from the matrix cathode (27);

(e) the control grid (20) is driven with a control grid voltage of greater than −250 V;

(f) the screen grid (23) is driven with a screen grid voltage of less than 650 V; and (g) the final stage tube (13) exhibits a plate efficiency greater than 80%.

2. Radio broadcast transmitter, as claimed in claim 1, wherein (a) the radio broadcast transmitter is a short-wave transmitter with a frequency range of at least 6 to 26 MHz and an output power of 100 kW;

(b) the final stage tube (13) is driven with a d.c. plate voltage of about 5 kV;

(c) the screen grid voltage is smaller than or equal to 500 V;

(d) the control grid voltage is approximately equal to −150 V±30%, (e) the distance (a1) from the control grid (20) to the matrix cathode (27) is about 0.55 mm and the distance (a2) from the screen grid (23) to the control grid (20) is about 0.45 mm;

(f) control grid (20) and screen grid (23) are designed as perforated cylinders made of pyrolytic graphite; and (g) cathode and control grid (20) exhibit on the base of the final stage tube (13) a cylindrical cathode connection (31) or control grid connection (32), where the control grid connection (32) extends coaxially in the interior of the cathode connection (31) and is fixed against it with a distance ring (33).

3. Radio transmitter, as claimed in claim 2, wherein (a) the modulation amplifier (8) is designed as a digital pulse step modulation (PSM) amplifier;

(b) an A/D converter (7) is arranged between the modulation amplifier (8) and the low-frequency input (34);

(c) the modulation amplifier (8) comprises a plurality of identical switching stages; and (d) the number of switching stages is greater than 1 and less than 20.

4. An AM radio broadcast transmitter, with an output power of at least 50 kW, comprising:

a low-frequency section comprising a low-frequency input and a modulation amplifier coupled to the low-frequency input; and a high-frequency section comprising an oscillator, a driver amplifier coupled to the oscillator and a final stage tube in a form of a tetrode, the final stage tube comprising a plate, a cathode, a control grid and a screen grid, wherein the plate is connected to an output of the modulation amplifier of the low-frequency section and wherein the control grid is connected to an output of the driver amplifier; wherein, the final stage tube is a low-voltage tetrode, operated with a d.c. plate voltage less than 10 kV, and whose cathode of the final stage tube is designed as a BaO-containing matrix cathode that is heated indirectly;

the control grid and the screen grid of the final stage tube are spaced less than 1 mm apart from each other and from the matrix cathode;

the control grid is driven with a control grid voltage of greater than −250 V;

the screen grid is driven with a screen grid voltage of less than 650 V; and the final stage tube exhibits a plate efficiency greater than 80%.

5. The radio broadcast transmitter of claim 4, wherein, the radio broadcast transmitter is a short-wave transmitter with a frequency range of at least 6 to 26 MHz and an output power of 100 kW;

the final stage tube is driven with a d.c. plate voltage of about 5 kV;

the screen grid voltage is smaller than or equal to 500 V;

the control grid voltage is approximately equal to −150 V ±30%;

a distance from the control grid to the matrix cathode is about 0.55 mm and a distance from the screen grid to the control grid is about 0.45 mm;

the control grid and screen grid are designed as perforated cylinders made of pyrolytic graphite; and the cathode and control grid exhibit on the base of the final stage tube a cylindrical cathode connection or control grid connection, wherein the control grid connection extends coaxially in an interior of the cathode connection and is fixed against it with a distance ring.

6. The radio transmitter of claim 5, wherein, the modulation amplifier is designed as a digital pulse step modulation amplifier;

an A/D converter is arranged between the modulation amplifier and the low-frequency input;

the modulation amplifier comprises a plurality of identical switching stages; and the number of switching stages is less than 20.

7. The radio transmitter of claim 6, wherein the number of switching stages is less than or equal to 14.

* * * * *